United States Patent
Lection et al.

(10) Patent No.: US 7,461,337 B2
(45) Date of Patent: Dec. 2, 2008

(54) EXCEPTION MARKUP DOCUMENTS

(75) Inventors: David B. Lection, Raleigh, NC (US);
Eric L. Masselle, Raleigh, NC (US);
Masato Noguchi, Sagamihara (JP);
David E. Reich, Jupiter, FL (US)

(73) Assignee: International Business Machines Corporation, Armonk, NY (US)

( * ) Notice: Subject to any disclaimer, the term of this patent is extended or adjusted under 35 U.S.C. 154(b) by 424 days.

(21) Appl. No.: 10/386,879

(22) Filed: Mar. 12, 2003

(65) Prior Publication Data
US 2004/0181750 A1 Sep. 16, 2004

(51) Int. Cl.
*G06F 17/00* (2006.01)
(52) U.S. Cl. .................... 715/237; 715/234
(58) Field of Classification Search .......... 715/513, 715/500, 501.1, 520, 248, 234, 235, 237; 707/10, 517; 709/203; 719/318
See application file for complete search history.

(56) References Cited

U.S. PATENT DOCUMENTS

| | | | |
|---|---|---|---|
| 6,178,430 | B1 | 1/2001 | Cohen et al. |
| 6,192,382 | B1 | 2/2001 | Lafer et al. |
| 6,199,081 | B1 * | 3/2001 | Meyerzon et al. ............ 715/513 |
| 6,327,600 | B1 * | 12/2001 | Satoh et al. ................. 715/530 |
| 6,829,745 | B2 * | 12/2004 | Yassin et al. ................ 715/513 |
| 6,832,263 | B2 * | 12/2004 | Polizzi et al. ............... 709/246 |
| 7,028,223 | B1 * | 4/2006 | Kolawa et al. ................ 714/38 |
| 7,058,886 | B1 * | 6/2006 | Sulistio et al. .............. 715/517 |
| 7,089,491 | B2 * | 8/2006 | Feinberg et al. ............. 715/522 |
| 7,203,671 | B1 * | 4/2007 | Wong ............................. 707/2 |
| 2001/0018697 | A1 * | 8/2001 | Kunitake et al. ............. 707/517 |
| 2001/0044810 | A1 * | 11/2001 | Timmons .................... 707/513 |
| 2002/0029296 | A1 | 3/2002 | Anuff et al. |
| 2002/0029299 | A1 * | 3/2002 | Kappel et al. ................ 709/318 |
| 2003/0237047 | A1 * | 12/2003 | Borson ....................... 715/513 |
| 2004/0098667 | A1 * | 5/2004 | Atkinson .................... 715/513 |

(Continued)

FOREIGN PATENT DOCUMENTS

EP 1071024 1/2001

(Continued)

OTHER PUBLICATIONS

Christian Wege, Portal Server Technology, May 2002, IEEE Computing, pp. 73-77.*

(Continued)

*Primary Examiner*—Stephen Hong
*Assistant Examiner*—Manglesh M Patel
(74) *Attorney, Agent, or Firm*—Akerman Senterfitt

(57) ABSTRACT

A method for excluding structures from a markup document can include identifying a section within a first markup document into which at least a portion of a second markup document is to be inserted. An exception markup document can be identified that specifies structures restricted within the section. The first markup document, the second markup document, and the exception markup document can be based upon the same markup language. The portion of the second markup document can be searched for at least one excluded structure specified within the exception markup document. If no excluded structure is found the portion can be inserted into the section. If at least one of the excluded structures is found, at least one exception handling operation can be performed.

18 Claims, 2 Drawing Sheets

U.S. PATENT DOCUMENTS

| | | | |
|---|---|---|---|
| 2004/0117803 A1* | 6/2004 | Srivastava et al. | 719/318 |
| 2004/0177315 A1* | 9/2004 | Brown et al. | 715/500 |
| 2005/0034032 A1* | 2/2005 | Uchida | 714/48 |
| 2007/0239749 A1* | 10/2007 | Farahbod | 707/101 |

FOREIGN PATENT DOCUMENTS

| | | |
|---|---|---|
| JP | 9231220 | 9/1997 |
| WO | WO 02/17082 | 2/2002 |

OTHER PUBLICATIONS

Eric der Vlist, Using W3C XML Schema, Oct. 2001, XML.com, pp. 1-15.*

Kip Hampton, Web Content Validation with XML::Schematron, Jan. 2002, xml.com, pp. 1-6.*

Ogbuji, Validating XML with Schematron, Nov. 2000, XML.com, pp. 1-6.*

Determining error-handling strategies (Coldfusion MX Applications), 2007, Adobe, pp. 1-2.*

Shah, Incremental Compilation and Error Handling in XMLBeans, 2007, dev2dev, pp. 1-10.*

Stylus Studio, Validating DTD Parser, 2007, Stylus Studio, pp. 1-3.*

Nelson, XML Schema Validation in the Microsoft Universe, 2002, marknelson, pp. 1-15.*

Thangarathinam, Exception Handling in Web Services, 2007, developer*com, pp. 1-9.*

Vojevodina et al., The Method for E-business Exception handling, 2005, IEEE, pp. 1-6.*

Brabrand, et al., "The <bigwig> Project", ACM Transactions on Internet Technology, vol. 2, No. 2, May 2002, pp. 79-114.

Hall, Robert, Oracle Corp., "Improving Performance of Dynamic Web Pages: How the ESI Sample Application Works", Apr. 2002, revised Aug. 2002.

Oracle Corp., "ESI—Accelerating E-Business Applications: Overview", Sep. 1, 2002.

Tsimelzon, et al., "ESI—Accelerating E-Business Applications: Language Spec 1.0", Akamai Technologies, Oracle Corp. 2001.

Kilpelainen, et al., "SGML and XML Document Grammars and Exceptions", Information and Computation, Sep. 15, 2001, vol. 169, Issue 2, pp. 230-251.

Rizzi, R., "Complexity of Context-fee Grammars with Exceptions and the Inadequacy . . . ", Markup Languages: Theory and Practice, Winter 2001, vol. 3, Issue 1, pp. 107-116.

* cited by examiner

EXCEPTION MARKUP DOCUMENTS

BACKGROUND OF THE INVENTION

1. Technical Field

The present invention relates to the field of software and, more particularly, to Web portals.

2. Description of the Related Art

Many Web sites utilize portals, which are anchor Web pages used as entry points or gateways to network accessible information. More specifically, a portal can include one or more containers within which externally derived content can be placed. For example, a portal can extract data from a content source, which can be a Web page. Portals, having the ability to group data from diverse and independently maintained sites, can be highly efficient structures for providing information to users. Since software development and maintenance can be extremely costly, leveraging pre-existing software from content sources within portal containers can save businesses considerable resources.

Portal construction is possible due to the extensive use of markup within network assessible documents. Markup refers to the sequence of characters or other symbols that can be inserted at certain places in an electronic document to indicate how the electronic document should look when the document is printed or displayed. Markup can also define logical structures, such as a table, a graphic element, and/or a data field, within an electronic document. Numerous standard markup languages exist that include, but are not limited to, HTML (Hypertext Markup Language), XML (Extensible Markup Language), SGML (Standard Generalized Markup Language), WML (Wireless Markup Language), and the like. Network accessible markup documents can generally be accessed and displayed using a Web browser, which can be a client program that utilizes the hypertext transfer protocol (HTTP) to make requests of servers for specified documents, usually markup documents.

Problems can occur with portals incorporating external content into containers because conventional markup languages lack variable type checking capabilities. Type checking is a software engineering concept referring to the testing for type compatibility between two variables. Type checking assures that only integer values are assigned to integer variables, only string values are assigned to string variables, only graphics assigned to graphic variables, and the like. Portal containers can be thought of as a particular type of object, a container object, that accepts values or content from the content source. Conventionally, markup code representing content is directly inserted into a container without any verification that the content is compatible with the container.

Notably, a container can be embedded within a defined structure of the portal. The defined structure can have content restrictions and structural restrictions associated with it. For example, the container can be a graphical frame intended to receive a digitally rendered graphical image, such as a GIF (Graphics Interchange Format) or a .JPEG (Joint Photographic Experts Group) file. In such an instance, content input should be limited to graphical images. Similarly, the container can be a text box into which a graphical image should not be inserted. In another example, content can contain formatting details that are incompatible with the container, such as attempting to display a white colored string within a container with a white background.

Often, portal designers are more interested in excluding a few select structures from a container than limiting a container to a tightly defined set of data types. Thus, a form of "structural exclusion checking" as opposed to true type checking would be valuable to portal designers. Structural exclusion checking can prevent numerous anomolies from occurring when restricted content or structures are inadvertently included within the container. The anomolies can result in run-time error messages, improperly formatted output, browser lock-up, and operating system crashes.

For example, a container may represent a cell within a table of a portal. While the insertion of a wide variety of variable types, such as graphics, sound, multimedia objects, text, and hyperlinks, into the container may be appropriate, a limited number of structures can be restricted. For example, a portal developer may wish to restrict the insertion of a table row into the container, which can result in undesirable formatting.

Conventional solutions to the aforementioned problem have proven inadequate. The most common conventional solution involves modification of a DTD (Document Type Definition) associated with a markup language document. Particularly, a DTD document can be constructed so that structures within a particular markup language will behave in non-standard ways. For example, a structure normally specifying a table row (TR) can be redefined within a DTD to have no functionality. When so defined, a markup tag specifying a table row structure is effectively ignored. Redefining a DTD violates standards, causes behavior fraught with potential errors and side effects, and is generally a disfavored technique from a structured programming viewpoint. Even if this solution were otherwise adequate, which it is not, DTD features vary from markup language to markup language. Thus, any DTD related solution is restricted to a particular markup language and cannot be applied generally.

SUMMARY OF THE INVENTION

The invention disclosed herein provides a method and a system for the handling of specified markup structures within containers of a Web portal. In particular, an exception markup document can be created which details structures excluded from a container within a Web portal. The container can receive content provided by a content source. For example, the content source can be a Web page and the content can be an electronic document written in a markup language. Before content is inserted into the container, the content can be modified in a manner specified by the exception markup document. Accordingly, the exception markup document can provide a means for excluding defined structures from a container. Content based exclusion handling before the content is incorporated within a container can prevent undesirable behavior from occurring within the portal.

For example, a particular container within a portal can be a cell of a table. An exception markup associated with the container can exclude structures referring to tables, such as <TR>, <TD>, </TR>, and </TD>. Before content is placed within a container, the content can be compared to the exception markup document to determine if excluded structures are contained within the content. If excluded structures are found, then the excluded structure can be removed from the content. Consequently, the container, in this case a cell of a table, will receive suitable content.

One aspect of the present invention can include a method for excluding structures from a markup document including identifying a section within a first markup document into which at least portion of a second markup document is to be inserted. An exception markup document can be identified that specifies structures restricted within the section. The first markup document, the second markup document, and the exception markup document can be based upon the same markup language. In one embodiment, the exception markup document can be disposed within the first markup document. In another embodiment, the exception markup document can identify a replacement structure associated with the excluded structure. The section within the first markup document can include many segments. The structures specified within the exception markup document as restricted segments can refer to particular ones of these segments as opposed to the entire section. At least one of the segments can be a structure as defined by the markup language of the first markup document.

The portion of the second markup document can be searched for at least one excluded structure specified within the exception markup document. If no excluded structure is found, the portion of the second markup document can be inserted into the section. If at least one of the excluded structures is found, at least one exception handling operation can be performed. For example, the exception handling operation can display a message indicating that restricted structures exist within the portion of the second markup document. In another example, the exception handling operation can delete an excluded structure from the portion of the second markup document and, thereafter, insert the second markup document into the section. Further, an initializing and a terminal location specifying the beginning and the end of the excluded structure can be identified. At least a portion of the structure content contained between the initializing location and the terminal location can be deleted.

The first markup document can be provided by a portal and the section can specify a container. The second markup document can include content provided by a content source. The content source can be different from the portal. For example, the content source and the portal can be different Web pages. Further, the content source and the portal can be disposed within different Web sites.

Another aspect of the present invention can include a system for providing exceptions for markup language documents including an exception markup document configured to specify at least one structure. In one embodiment, the exception markup document can include a handling instruction associated with at least one structure specified within the exception markup document. In another embodiment, at least one structure specified within the exception markup can be dependant upon a Web browser used to display structures. A container can be disposed within a portal, wherein the container can be configured to receive content from a content source external to the portal.

Additionally, the system can include a means for comparing structures contained within the content to structures specified within the exception markup document. The system can also include an exception handler configured to perform an exception handling operation responsive to matches discovered by the comparing engine. The exception handler can prevent content containing restricted structures from being inserted into the container. In one embodiment, the exception handler can display a message responsive to matches discovered by the comparing engine.

BRIEF DESCRIPTION OF THE DRAWINGS

There are shown in the drawings embodiments, which are presently preferred, it being understood, however, that the invention is not limited to the precise arrangements and instrumentalities shown.

DETAILED DESCRIPTION OF THE INVENTION

The invention disclosed herein provides a system and a method for excluding structures from a portal container. More particularly, an exception markup document can be associated with a portal container and can specify excluded markup structures. Any content that is to be inserted into the portal container can be examined. If any of the specified structures are contained within the content, an exception handling operation can be performed. One such exception handling operation can cause a warning message to be displayed. Another exception handling operation can remove excluded structures from the content, thereafter incorporating the content into the container. The portal, the content, and the exception markup can all be specified using the same markup language.

As used herein, a structure can refer to a descriptor definable by a markup tag or tags. A typical structure has an opening tag and a closing tag which indicate the scope of a given structure. For example, a table row structure can be described by the tags <TR> and </TR>, where markup occurring between the tags is contained within the table row. Structures can be embedded inside other structures by placing tags for one structure within the opening tag and closing tag of another structure. A myriad of structures referenced by tags exist for the different markup languages and are well known to those of ordinary skill in the art. The invention disclosed herein is not restricted to any particular set or subset of structures and can be used in conjunction with any structure defined within a variety of markup languages, including structures specifying formatting characteristics, document sections, processes, displayable items, and the like.

Figure 1:
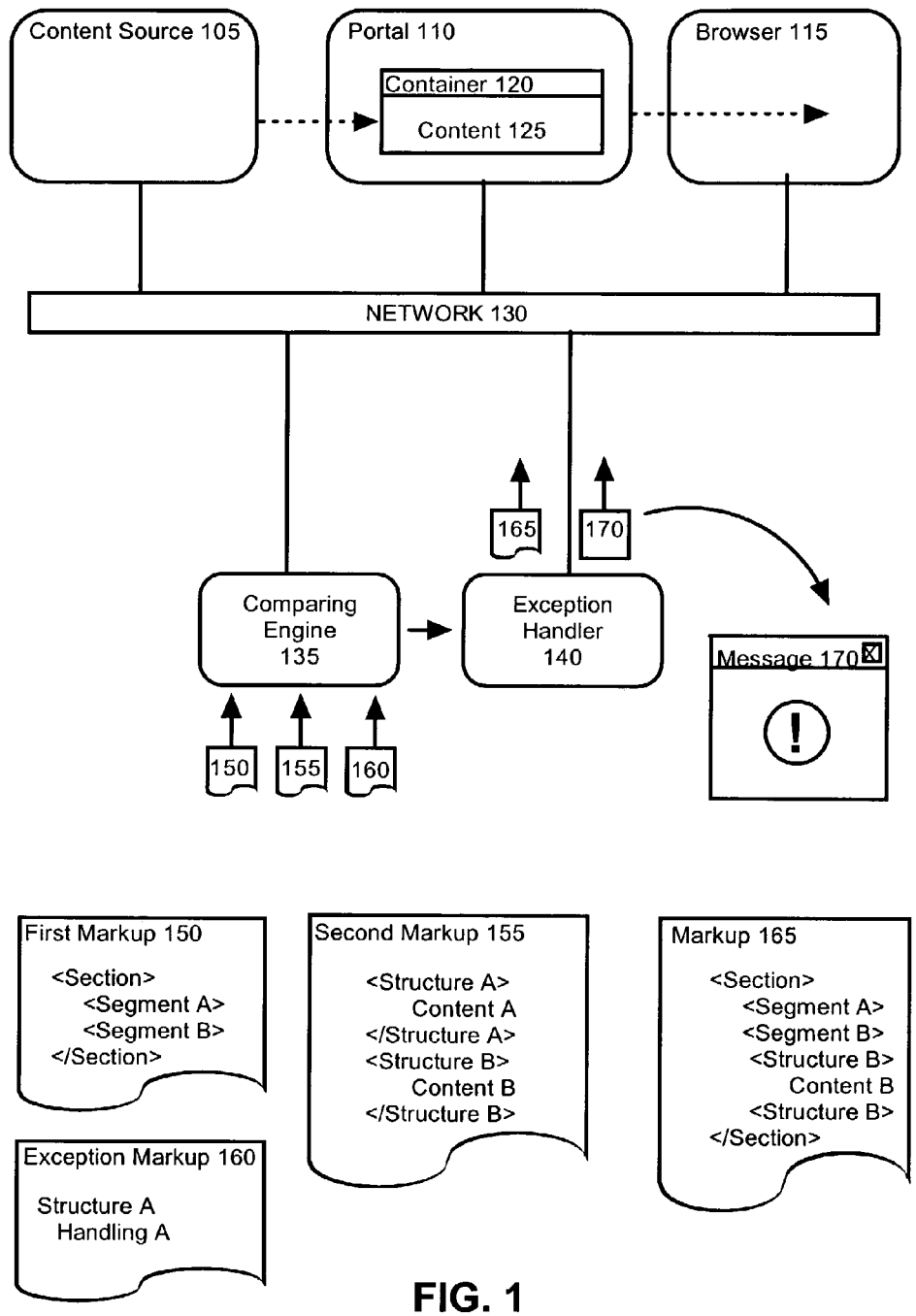
FIG. 1 is a schematic diagram illustrating a system including an exception markup document in accordance with the inventive arrangements disclosed herein.

FIG. 1 is a schematic diagram illustrating a system 100 including an exception markup document. The system 100 operates within an environment that can include a content source 105, a portal 110 with a container 120, a browser 115, and a network 130. Further, the system 100 can include a comparing engine 135 and an exception handler 140 which perform numerous operations upon and/or responsive to electronic documents written in a markup language, such as HTML (Hypertext Markup Language), XML (Extensible Markup Language), SGML (Standard Generalized Markup Language), WML (Wireless Markup Language), and the like. These markup documents can include a first markup 150, a second markup 155, an exception markup 160, and a markup 165.

The content source 105 can be a Web page that contains content 125. The portal 110 can be another Web page that includes a container 120, which incorporates the content 125 provided by the content source 105. In one embodiment, the container 125 is merely a structure for receiving content. Notably, the container 125 can manifest itself as a visible structure when rendered by the browser 115. For example, the container 125 can be a frame, cell within a table, a text box, and the like. In other cases, the container 125 need not have a visible form when rendered, but can manifest itself in another manner. For example, a container can be for a digital audio file which can be played. In another example, a container can trigger a computer operation, such as triggering a program or application. The browser 115 can be a client application which presents the portal 110 to a user. The content source 105, the portal 110, and the browser 115 can be communicatively linked via a network 130, such as the Internet.

The first markup 150 can be an electronic document specifying the portal 110. One section of the first markup 150 can specify the container 120. The content 125 can be incorporated into the section. In one embodiment, the section of the first markup 150 can contain multiple segments each of which can contain different structures. The content 125 can be incorporated into particular ones of the different structures of the first markup 150, where each segment can have different associated structural restrictions.

The second markup 155 can specify content 125 extracted from the content source 105. The exception markup 160 can be a markup document that can specify one or more structures, which are excluded from the container 120. The exception markup 160 can also provide handling instructions which detail actions to be taken whenever a restricted structure is detected within the second markup 155. The markup 165 can be the electronic document that is ultimately presented within the browser 115. The markup 165 can include the first markup 150 with a modified version of the second markup 155 contained within a specified section. The structures specified within the exception markup 160 can be removed from the second markup 155 to create the modified version of the second markup 155.

The comparing engine 135 can examine the second markup 155 for structures excluded by the exception markup 160. If matches are found, indicating that one or more restricted structures are contained within the second markup 155, the exception handler 140 can perform an exception handling operation. For example, the exception handler 140 can generate a message 170 that indicates an excluded structure was discovered within the second markup 155. In another example, the exception handler 140 can remove restricted structures from the second markup 155 and generate the markup 165. The markup 165 can be rendered by the browser 115.

In operation, an environment can exist where the first markup 150 can be associated with the portal 110 and where a section within the first markup can be associated with the container 120. The container 120 can be specified by the second markup 155. Further, the exception markup 160 can specify structures excluded from the container 120. This environment can respond to an attempt by the browser 115 to access the portal 110 via the network 130. Once contacted, the portal 110 can attempt to fill the container 120 with information by accessing the content source 105. The content source 105 can convey the content 125 for the container 120 via the network 130.

Before any document containing restricted structures is rendered within the browser 115, the comparing engine 135 can determine whether the second markup 155 contains any restricted structures. For example, the exception markup 160 can restrict Structure A from appearing within the section of the first markup 150 associated with container 120. In the depicted example, the comparing engine 135 can detect that Structure A, which includes Content A, appears within the second markup 155. The comparing engine 135 can then convey the first markup 150, the second markup 155, the exception markup 160, as well as an annotation for the discovered match to the exception handler 140. Upon receiving an annotation that a match for restricted Structure A was found, the exception handler 140 can search exception markup 160 for handling instructions. Assume, for this example, that Handling A is a handling instruction that indicates a restricted structure and all included content is to be removed and the resulting markup generated. The exception handler 140 can interpret Handling A and responsively generate the markup 165. Alternatively or conjunctively, a handling instruction can specify that message 170 is to be created by the exception handler 140. If markup 165 is generated, it can be rendered within browser 115.

It should be noted that the comparing engine 135 and the exception handler 140 can be located in numerous places within the system 100. For example, the comparing engine 135 and the exception handler 140 can be disposed within a server of the portal 110. In such an embodiment, the portal 110 can retrieve the content 125 from the content source 105 and integrate the content 125 within the container 120. The integrated information can be specified as markup 165 which can be conveyed to the browser 115.

In another embodiment, the comparing engine 135 and exception handler 140 can be contained within an information requesting computer in which the browser 115 resides, referred to as the client. In such an embodiment, the portal 110 can convey the first markup 150 and the exception markup 160 to the client. The first markup can contain linking information for retrieving the content 125 from the content source 105. The client can utilize the linking information to request and receive the second markup 155. Once the client has received the required markup documents, the client can use the comparing engine 135 and the exception handler 140 to construct the markup 165 and/or message 170.

In a further embodiment, the comparing engine 135 and exception handler 140 can be a plug-in application for the browser 115. In another embodiment, the comparing engine 135 and exception handler 140 can be a client-side application, such as a cookie. Moreover, the functionality described by the comparing engine 135 and the exception handler 140 can be distributed across numerous hardware and software elements, each of which can be communicatively linked to one another through network 130.

It should be noted that the structures specified within the exception markup 160 can contain restricted formatting and/or positioning components. The exception markup 160 can specify these restricted components and either exclude the structures from the markup 165 or specify changes which the exception handler 140 can enact. In one example where the container 120 has a white background, the exception markup 160 can exclude any structure that is white or has a "white" attribute. Alternately, the exception markup 160 can specify that any "white" structure should be converted to a "black" structure. Further, the exception markup 160 can exclude or modify structures with a particular font or font size. For example, the exception markup 160 can specify that any textual structures written in an "Arial" font be converted to a "Courier" font.

In another example, the second markup 155 can include items having positioning coordinates, which can be expressed in either relative or absolute terms. It should be appreciated that rendering a content item at certain positions can result in content items being positioned outside the boundaries of the container 120, thereby causing disruptions to the format of the portal 110. To resolve this problem, the exception markup 160 can exclude any structures with absolute positioning coordinates. In another embodiment, absolute positioning coordinates within the second markup 155 can be converted to relative coordinates by the exception handler 140. Moreover, relative coordinates exceeding positional limits defined within the exception markup 160 can be excluded or modified by the exception handler 140.

In a further embodiment, the exception markup 160 can selectively exclude style attributes associated with specified structures. For example, the exception markup 160 can include an exception such as "<div style=X, white>" causing the exception handler 140 to exclude all structures with the specified style attribute. Within the example, structures of type "<div>" without the style attribute and structures of type "<div>" where "style" !="X, white" can be permitted within the markup 165. In another example, the exception markup 160 can direct the exception handler 140 to modify the style of structures from an excluded style to a specified style. For instance, the exception markup 160 can specify "<div style=X, white> change_to <div style=X, black>" resulting in the exception handler 140 making a corresponding change in the markup 165.

Figure 2:
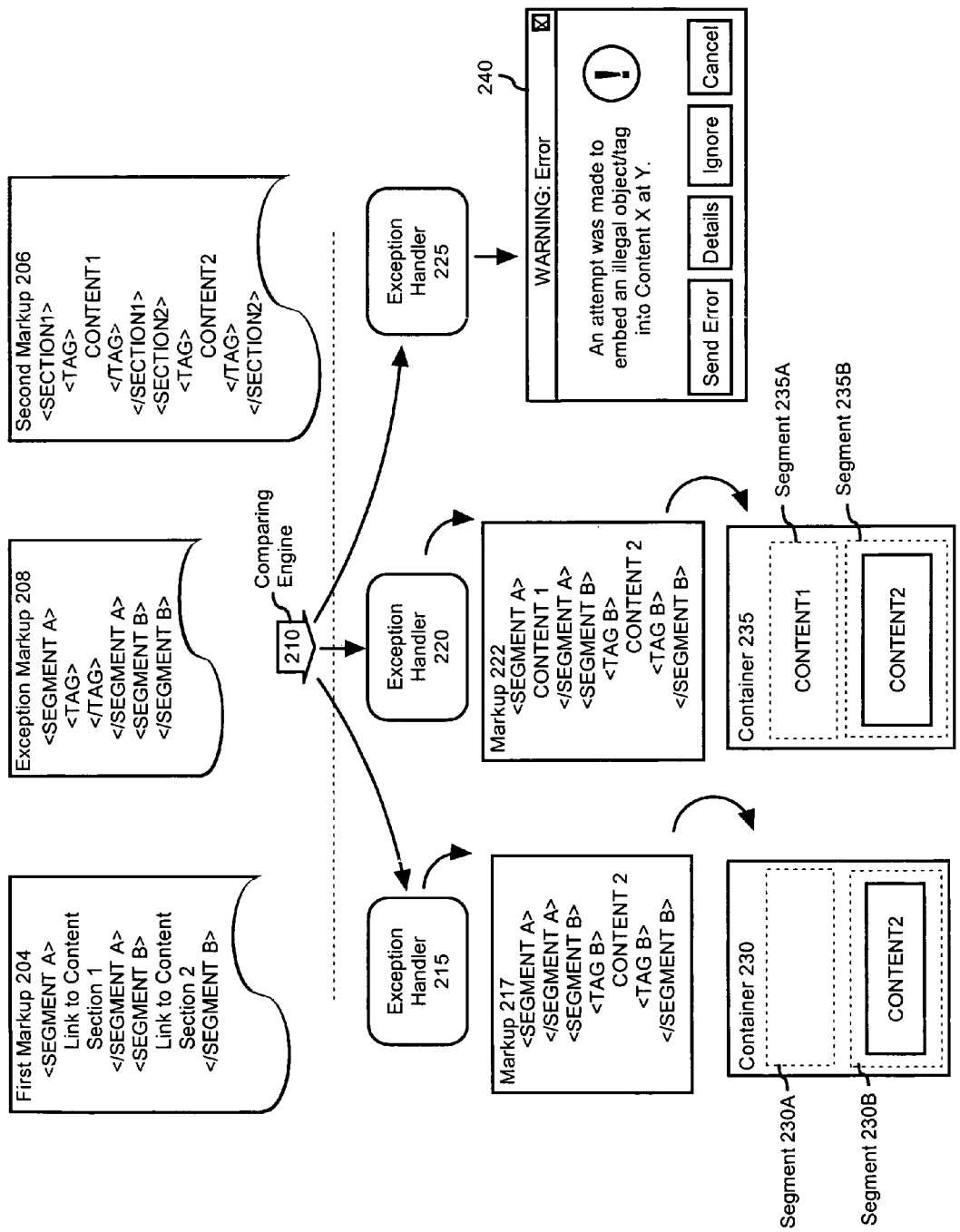
FIG. 2 is a schematic diagram illustrating a system for performing exclusion handling in accordance with restrictions specified within an exception markup document using the system shown in FIG. 1.

FIG. 2 is a schematic diagram illustrating a system 200 for performing exclusion handling in accordance with restrictions specified within an exception markup document using the system shown in FIG. 1. System 200 can include a first markup 204, a second markup 206, an exception markup 208, a comparing engine 210, exception handlers 215, 220, and 225, markups 217 and 222, containers 230 and 235, and message 240. The first markup 204 represents the portion of markup for the portal within which content can be inserted. The first markup 204 can include a Segment A into which content from Section 1 of a referenced document is to be inserted. Additionally, the first markup 204 can include a Segment B into which content from Section 2 of a referenced document is to be inserted.

The second markup 206 represents data as extracted from a content source. The second markup 206 contains two sections labeled Section 1 and Section 2, each with a structure labeled as Tag. The Tag structure of Section 1 contains Content 1 and the Tag structure of Section 2 contains Content 2.

The exception markup 208 is a markup document that details structures to be excluded from an associated container, namely the container portion specified within the first markup 204. Exception markup 208 specifies that any structure of type Tag that occurs within Section A should undergo some form of exception handling. Moreover, the exception markup 208 specifies that a structure of type Tag is allowed outside of Section A and that no structural restrictions apply to Segment B.

Using the exception markup 208 as shown in FIG. 2, the comparing engine 210 can determine that any structure of type Tag inserted into Segment A of the first markup 204 is a restricted structure. Accordingly, the Tag structure appearing within Section 1 of the second markup 206 can be a restricted structure. At this point, an exception handler can perform one or more exception handling operations. Three different exception handlers are shown in system 200, each of which responsively performs a different exception handling operation.

Exception handler 215 can exclude restricted structures and all content contained within the restricted structure. Accordingly, exception handler 215 can generate markup 217 by deleting the Tag and Content 1 (<Tag> . . . </Tag>) from Section 1 of the second markup 206. The container 230 can be a rendering of markup 217. In the container 230, an area for Segment 230A can contain no retrieved data, while an area for Segment 230B can retain the original formatting from the second markup 206, which includes a structure containing Content 2.

Exception handler 220 can exclude restricted structures while retaining content included within the restricted structure. Accordingly, exception handler 220 can generate markup 222 by deleting the <Tag> and <Tag/> lines from the Section 1 of the second markup 206. The container 235 can be a rendering of markup 222. In the container 235, an area for Segment 235A can contain Content 1, while an area for Segment 235B can retain the original formatting from the second markup 206, which includes a structure containing Content 2.

Exception handler 225 can cause message 240 to be displayed. The message 240 can be particularly helpful to developers of a Web portal by highlighting potential problems so that the problems can be eliminated. When used during design time, error conditions, helpful links, and problematic structures can be displayed within view 240. When used within a run-time environment, message 240 can contain user selectable handling options. For example, a user can be informed of a potential problem, and be presented with handling choices, such as using the process detailed in exception handler 215 verses that of exception handler 220. The selected handling technique can be responsively applied. Further, the user can default to a selected exception handling routine without being prompted by view 240 or be prompted by view 240 whenever an exception is identified. Additionally, options that result in a modification of the exception markup 208 can appear within the exception handler 225. An option to report a problem to the portal Webmaster can also be included within view 240.

It should be appreciated by one of ordinary skill in the art that exception handlers 215, 220, and 225 are used for illustrative purposes only and the invention is not restricted to such handling routines. Instead, any error handling and/or exception handling technique ordinarily used within software design can be used. For example, a system can automatically modify the content to retain as much data as possible while excepting restricted content. For instance, algorithms can be used to determine if content within a restricted structure can be removed from the structure successfully. If a restricted structure can be removed, a first exception handler can be used. Otherwise, a different exception handler can be automatically selected, such as one that removes a restricted structure and all markup contained between the insertion tag and closing tag of the restricted structure. Alternatively, a user can manually select one of a variety of available exception handling routines.

Further, it should be noted that the invention can be used with any markup language. By including exceptions within a markup document, the invention is extremely flexible and easily incorporated across a variety of hardware and software platforms. Moreover, the standards and mechanisms used to convey markup documents, such as the content markup and the markup for the portal itself can be used to convey the exception markup. Accordingly, exception markup documents can be conveyed in conjunction with other markup documents and exclusion handling can occur at a client and/or server location(s).

While the examples expressed within FIGS. 1 and 2 have described particular manners for detailing exceptions within the exception markup 208, the invention is not limited to those particular examples. Any specification technique that is well known by ordinary practitioners in the art of software design and programming can be utilized within the exception markup 208 to describe excluded structures. For example, programming logic can be included within the exception markup 208 to permit complex structure identification and situation dependant exclusion handling. Additionally, while the exception markup 208 can be a stand alone markup document, it need not be. For example, the exception markup 208 can be a defined section within a portal markup document.

In one embodiment, the exception markup 208 can contain one section for permitted structures and a second section for excluded structures. Such an embodiment can allow multiple exception markups to define allowable structures, since a second exception markup document can be referenced whenever a particular structure is not included within a first exception markup document. Implementations allowing for the referencing of multiple exception markup documents can be extremely flexible. For example, one exception markup document can contain browser-related constraints, another document can contain hardware constraints, another document can contain portal-defined constraints, still another can contain content-provider constraints, and yet another can contain user-defined constraints. A prioritization scheme can be used to determine the order in which multiple exception markups should be referenced.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented method for excluding structures from a markup document comprising the steps of:
   identifying a section within a first markup document into which at least a portion of a second markup document is to be inserted;
   combining a plurality of exception markup documents into a portal exception markup document specifying restricted structures associated with said section of said first markup document and specifying handling instructions for actions performed if at least one restricted structure is detected within said portion of said second markup document, wherein each restricted structure defines a non-allowable format or data type not allowed by said section of said first markup document, wherein said first markup document, said second markup document, and said exception markup document are specified in a same markup language, wherein said plurality of combined exception markup documents are selected from documents specifying browser-related restricted structures, documents specifying hardware restricted structures, documents specifying portal-defined restricted structures, documents specifying content provider restricted structures, and documents specifying user-defined restricted structures, wherein the portal exception markup document is not restricted to a particular markup language;
   comparing said portion of said second markup document with the restricted structures associated with said section of said first markup document specified within said portal exception markup document;
   if no restricted structure is found by said comparing step, inserting said portion of said second markup document into said section of said first markup document; and,
   if at least one restricted structure is found by said comparing step, performing at least one action based on said handling instructions, said at least one action comprising displaying a message indicating that restricted structures exist within said portion of said second markup document and presenting one or more user selectable handling choices for said restricted structure.

2. The method of claim 1, wherein said first markup document is provided by a portal, wherein said section of said first markup document specifies a container, and wherein said second markup document includes content provided by a content source, wherein said content source is different from said portal.

3. The method of claim 1, wherein at least one of said handling choices comprises:
   deleting said restricted structure from said portion of said second markup document and inserting said portion within said section of said first markup document.

4. The method of claim 1, further comprising:
   identifying an initializing location specifying the beginning of said restricted structure;
   identifying a terminal location specifying the ending of said restricted structure;
   identifying structure content contained between said initializing location and said terminal location; and,
   deleting at least a portion of said structure content.

5. The method of claim 1, further comprising:
   identifying within said portal exception markup document a replacement structure associated with said restricted structure; and,
   within said portion of said second markup document, replacing said restricted structure with said replacement structure.

6. The method of claim 1, wherein said section of said first markup document comprises a plurality of segments, said method further comprising:
   limiting at least a portion of said restricted structures identified within said portal exception markup document to particular ones of said segments as specified within said portal exception markup document.

7. The method of claim 6, wherein at least one of said segments is a structure.

8. The method of claim 1, wherein said portal exception markup document is disposed within said first markup document.

9. A system including a processor for providing exceptions for markup language documents comprising:
   A portal exception markup document configured to specify at least one restricted structure, wherein each restricted structure defines a structure having a non-allowable format or data type in a predefined context, wherein said portal exception markup document is generated by combining a plurality of exception markup documents, wherein said plurality of combined exception markup documents are selected from documents specifying browser-related restricted structures, documents specifying hardware restricted structures, documents specifying portal-defined restricted structures, documents specifying content provider restricted structures, and documents specifying user-defined restricted structures, wherein the portal exception markup document is not restricted to a particular markup language;

a container disposed within a portal, wherein said container is configured to receive content from a content source external to said portal, wherein said portal, said content, and said portal exception markup document are specified in a same markup language;

a comparison engine for comparing structures contained within said content with restricted structures specified within said portal exception markup document; and, a restricted structure handler configured to perform at least one handling action in response to said comparison engine identifying a restricted structure within said content, wherein in response to identifying said restricted structure within said content said at least one handling action comprises displaying a message indicating that said restricted structure exists within said content and presenting one or more user selectable handling choices for said restricted structure, wherein said handling choices prevent restricted structures specified within said portal exception markup document from being inserted within said container.

10. The system of claim 9, wherein said exception markup document further comprises:

a handling instruction associated with at least one restricted structure specified within said portal exception markup document, wherein said at least one handling action is based upon said handling instruction.

11. A machine-readable storage having stored thereon, a computer program having a plurality of code sections, said code sections executable by a machine for causing the machine to perform the steps of:

identifying within a first markup document section having a predefined format and data type into which at least a portion of a second markup document is to be inserted;

combining a plurality of exception markup documents into a portal exception markup document specifying restricted structures within said first markup document section and specifying handling instructions for actions performed if at least one restricted structure is detected within said portion of said second markup document, wherein each restricted structure defines a format or data type incompatible with the predefined format or data type of said first markup document section, wherein said first markup document, said second markup document, and said exception markup document are specified in a same markup language, wherein said plurality of combined exception markup documents are selected from documents specifying browser-related restricted structures, documents specifying hardware restricted structures, documents specifying portal-defined restricted structures, documents specifying content provider restricted structures, and documents specifying user-defined restricted structures, wherein the portal exception markup document is not restricted to a particular markup language;

comparing said portion of said second markup document with the restricted structures associated with said first markup document section specified within said portal exception markup document, wherein said portion of said second markup document is compared with said restricted structures specified in said portal exception markup document according to a priority order, wherein said priority order is associated with a priority specified for each of said plurality of combined exception markup documents;

if no restricted structure is found by said comparing step, inserting said portion of said second markup document into said first markup document section; and, if at least one restricted structure is found by said comparing step, performing at least one action based on said handling instructions, said at least one action comprising displaying a message indicating that restricted structures exist within said portion of said second markup document and presenting one or more user selectable handling choices for said restricted structure.

12. The machine-readable storage of claim 11, wherein said first markup document is provided by a portal, wherein said section of said first markup document specifies a container, and wherein said second markup document includes content provided by a content source, wherein said content source is different from said portal.

13. The machine-readable storage of claim 11, wherein at least one of said handling choices comprises:

deleting said restricted structure from said portion of said second markup document and inserting said portion within said section of said first markup document.

14. The machine-readable storage of claim 13, further comprising:

identifying an initializing location specifying the beginning of said restricted structure;

identifying a terminal location specifying the ending of said restricted structure;

identifying structure content contained between said initializing location and said terminal location; and, deleting at least a portion of said structure content.

15. The machine-readable storage of claim 11, further comprising:

identifying within said portal exception markup document a replacement structure associated with said restricted structure; and, within said portion of said second document, replacing said restricted structure with said replacement structure.

16. The machine-readable storage of claim 11, wherein said section of said first markup document comprises a plurality of segments, said method further comprising:

limiting at least a portion of said restricted structures identified within said portal exception markup document to particular ones of said segments as specified within said portal exception markup document.

17. The machine-readable storage of claim 16, wherein at least one of said segments is a structure.

18. The machine-readable storage of claim 11, wherein said portal exception markup document is disposed within said first markup document.

* * * * *